(12) United States Patent
Moseley (10) Patent No.: US 11,226,699 B2
(45) Date of Patent: Jan. 18, 2022

(54) MINIMAL DRIVING OF TRANSMITTERS TO INCREASE HOVER DETECTION

(71) Applicant: Tactual Labs Co., New York, NY (US)

(72) Inventor: Braon Moseley, Round Rock, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 16/159,618

(22) Filed: Oct. 13, 2018

(65) Prior Publication Data
US 2019/0114028 A1    Apr. 18, 2019

Related U.S. Application Data

(60) Provisional application No. 62/572,005, filed on Oct. 13, 2017.

(51) Int. Cl.
*G06F 3/041* (2006.01)
*G06F 3/044* (2006.01)

(52) U.S. Cl.
CPC .......... *G06F 3/0416* (2013.01); *G06F 3/0446* (2019.05); *G06F 3/041661* (2019.05); *G06F 2203/04104* (2013.01); *G06F 2203/04108* (2013.01)

(58) Field of Classification Search
CPC .... G06F 3/044; H03K 17/962; H03K 17/955; H03K 17/9645; G01D 5/24
See application file for complete search history.

(56) References Cited

U.S. PATENT DOCUMENTS

| | | | |
|---|---|---|---|
| 7,952,962 B2* | 5/2011 | Walley | A63F 13/235 367/124 |
| 9,990,093 B2* | 6/2018 | Lai | G06F 3/044 |
| 10,558,302 B2* | 2/2020 | Shahparnia | G06F 3/0418 |
| 2009/0127005 A1* | 5/2009 | Zachut | G06F 3/0418 178/18.03 |
| 2009/0251434 A1* | 10/2009 | Rimon | G06F 1/30 345/173 |
| 2012/0013546 A1* | 1/2012 | Westhues | G06F 3/044 345/173 |
| 2012/0113051 A1* | 5/2012 | Bird | H04B 13/005 345/174 |
| 2012/0293451 A1* | 11/2012 | Van Schyndel | G06F 1/1643 345/174 |
| 2013/0050144 A1* | 2/2013 | Reynolds | G06F 3/0416 345/174 |
| 2013/0211757 A1* | 8/2013 | Miyamoto | G06F 3/0416 702/65 |
| 2013/0265276 A1* | 10/2013 | Obeidat | G06F 3/041662 345/174 |
| 2014/0210731 A1* | 7/2014 | Parekh | G06F 3/044 345/173 |

(Continued)

*Primary Examiner* — William Lu
(74) *Attorney, Agent, or Firm* — Adam Landa (57) ABSTRACT

A touch sensor is provided with different operational modes. One mode may be the operation of the touch sensor with a reduced set of transmitting rows than another mode. Transmitting on a reduced set of rows from the normal set of transmitting rows provides an operational mode that is able to detect touch events at greater distances from the touch surface than when a full set of transmitting rows is being driven.

20 Claims, 5 Drawing Sheets

(56) References Cited

U.S. PATENT DOCUMENTS

| | | | |
|---|---|---|---|
| 2014/0340351 A1* | 11/2014 | Forlines | G06F 3/0416 345/174 |
| 2014/0375590 A1* | 12/2014 | Cok | G06F 3/044 345/174 |
| 2015/0002444 A1* | 1/2015 | Brunet | G06F 3/0416 345/174 |
| 2015/0109212 A1* | 4/2015 | Yao | G06F 3/044 345/173 |
| 2015/0160754 A1* | 6/2015 | Wenzel | G06F 3/0445 345/174 |
| 2015/0160756 A1* | 6/2015 | Polishchuk | G09G 5/006 345/174 |
| 2015/0261377 A1* | 9/2015 | Reynolds | G06F 3/0416 345/174 |
| 2015/0309610 A1* | 10/2015 | Rabii | G06F 3/041662 345/174 |
| 2016/0224177 A1* | 8/2016 | Krah | G06F 3/0416 |
| 2019/0042032 A1* | 2/2019 | Moseley | G06F 3/046 |
| 2019/0102010 A1* | 4/2019 | Knabenshue | G06F 3/044 |

* cited by examiner

MINIMAL DRIVING OF TRANSMITTERS TO INCREASE HOVER DETECTION

This is a non-provisional patent application and claims the benefit of U.S. Provisional Patent Application Ser. No. 62/572,005, entitled "High Proximity Minimal Transmit Sensor Driver," filed Oct. 13, 2017, the contents of which is hereby incorporated herein by reference.

FIELD

The disclosed systems relate in general to the field of user input, and in particular to devices sensitive to the use of various input styluses and touch.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

In various embodiments, the present disclosure is directed to systems (e.g., objects, panels or keyboards) sensitive to hover, contact and pressure and their applications in real-world, artificial reality, virtual reality and augmented reality settings. It will be understood by one of ordinary skill in the art that the disclosures herein apply generally to all types of systems using fast multi-touch to detect hover, contact and pressure. In an embodiment, the present system and method can be applied to panels and display surfaces, including but not limited to smart boards, smart pads and interactive displays.

Throughout this disclosure, the terms "touch", "touches", "touch event", "contact", "contacts", "hover", or "hovers" or other descriptors may be used to describe events or periods of time in which a key, key switch, user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a stylus or pen, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch". Generally, as used herein, the word "hover" refers to non-contact touch events or touch, and as used herein the term "hover" is one type of "touch" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The present application contemplates various embodiments of sensors designed for detecting touch events. The sensor configurations are suited for use with frequency-orthogonal signaling techniques (see, e.g., U.S. Pat. Nos. 9,019,224 and 9,529,476, and 9,811,214, all of which are hereby incorporated herein by reference). The sensor configurations discussed herein may be used with other signal techniques including scanning or time division techniques, and/or code division techniques. It is pertinent to note that the sensors described and illustrated herein are also suitable for use in connection with signal infusion (also referred to as signal injection) techniques and apparatuses.

The presently disclosed systems and methods involve principles related to and for designing, manufacturing and using capacitive based sensors, and particularly capacitive based sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, interactions are sensed when a signal from a row is coupled (increased) or decoupled (decreased) to a column and the result received on that column. By sequentially exciting the rows and measuring the coupling of the excitation signal at the columns, a heatmap reflecting capacitance changes, and thus proximity, can be created.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540,458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

Figure 1:
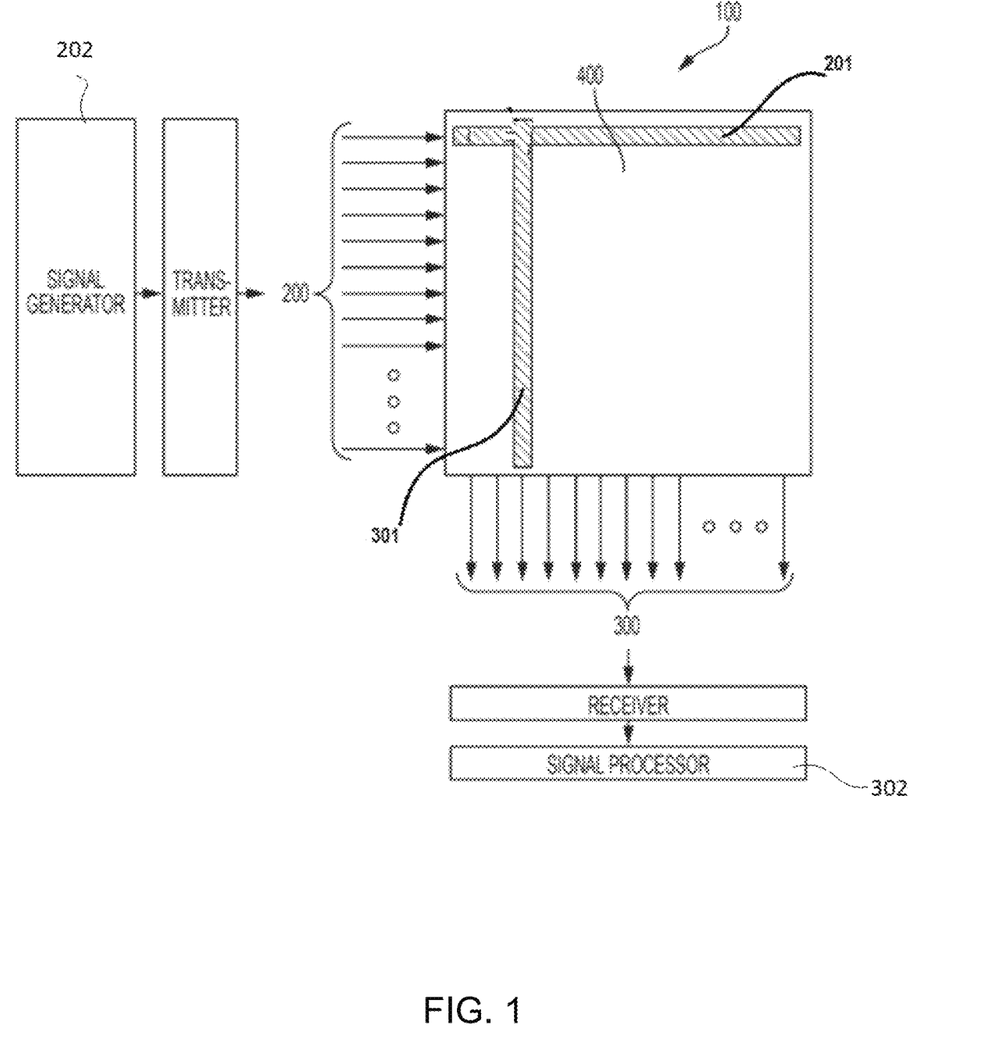
FIG. 1 is a diagram of sensor.

FIG. 1 illustrates certain principles of a fast multi-touch sensor 100 in accordance with an embodiment. Transmitter 200 transmits a different signal, generated by signal generator 202, into each of the transmitting conductors 201 of the panel 400. The signals are designed to be "orthogonal", i.e., separable and distinguishable from each other. A receiver 300 is attached to each receiving conductor 301 and has operatively connected thereto a signal processor 302. The transmitting conductors 201 and the receiving conductors 301 are conductors (also referred to as antennas) that are able to transmit and/or receive signals. The receiver 300 is designed to receive any of the transmitted signals, or an arbitrary combination of them, with or without other signals and/or noise, and to individually determine a measure, e.g., a quantity for each of the orthogonal transmitted signals present on that receiving conductor 301. The panel 400 of the sensor comprises a series of transmitting conductors 201 and receiving conductors 301 (not all shown), along which the orthogonal signals can propagate. In an embodiment, the transmitting conductors 201 and receiving conductors 301 are arranged such that a touch event will cause a change in coupling between at least one of the transmitting conductors 201 and at least one of the receiving conductors 301. In an embodiment, a touch event will cause a change in the amount (e.g., magnitude) of a signal transmitted on a transmitting conductor 201 that is detected in the receiving conductor 301. In an embodiment, a touch event will cause a change in the phase of a signal transmitted on a transmitting conductor 201 that is detected on a receiving conductor 301. Because the sensor 100 ultimately detects a touch event due to a change in the coupling, it is not of specific importance, except for reasons that may otherwise be apparent to a particular embodiment, the type of change that is caused to the touch-related coupling by a touch. As discussed above, the touch, or touch event does not require a physical touching, but rather an event that affects the coupled signal. In an embodiment the touch or touch event does not require a physical touching, but rather an event that affects the coupled signal in a repeatable or predictable manner.

With continued reference to FIG. 1, in an embodiment, generally, the result of a touch event in the proximity of both a transmitting conductor 201 and receiving conductor 301 causes a change in the signal that is transmitted on a transmitting conductor 201 as it is detected on a receiving conductor 301. In an embodiment, the change in coupling may be detected by comparing successive measurements on the receiving conductor 301. In an embodiment, the change in coupling may be detected by comparing the characteristics of the signal transmitted on the transmitting conductor 201 to a measurement made on the receiving conductor 301. In an embodiment, a change in coupling may be measured both by comparing successive measurements on the receiving conductor 301 and by comparing known characteristics of the signal transmitted on the transmitting conductor 201 to a measurement made on the receiving conductor 301. More generally, touch events cause, and thus correspond to, measurements of the signals on the receiving conductor 301. Because the signals on the transmitting conductors 201 are orthogonal, multiple row signals can be coupled to a receiving conductor 301 and distinguished by the receiver 300. Likewise, the signals on each transmitting conductor 201 can be coupled to multiple receiving conductors 301. For each receiving conductor 301 coupled to a given transmitting conductor 201 (and regardless of how touch affects the coupling between the row and column), the signals measured on the receiving conductors 301 contain information that will indicate which transmitting conductors 201 are being touched simultaneously with that receiving conductor 301. The magnitude or phase shift of each signal received is generally related to the amount of coupling between the column 301 and the row 201 carrying the corresponding signal, and thus, may indicate a distance of the touching object to the surface, an area of the surface covered by the touch and/or the pressure of the touch.

In various implementations of a touch device, physical contact with the transmitting conductor 201 and/or receiving conductor 301 is unlikely or impossible as there may be a protective barrier between the rows 201 and/or columns 301 and the finger or other object of touch. Moreover, generally, the transmitting conductor 201 and receiving conductor 301 themselves are not in physical contact with each other, but rather, placed in a proximity that allows signal to be coupled there-between, and that coupling changes with touch. Generally, the row-column coupling results not from actual contact between them, nor by actual contact from the finger or other object of touch, but rather, by the effect of bringing the finger (or other object) into proximity—which proximity results in a change of coupling, which effect is referred to herein as touch.

In an embodiment, the orientation of the transmitting conductor 201 and receiving conductor 301 may vary as a consequence of a physical process, and the change in the orientation (e.g., movement) of the transmitting conductor 201 and/or receiving conductor 301 with respect to one-another may cause a change in coupling. In an embodiment, the orientation of a transmitting conductor 201 and a receiving conductor 301 may vary as a consequence of a physical process, and the range of orientation between the transmitting conductors 201 and receiving conductors 301 includes ohmic contact, thus in some orientations within a range a transmitting conductor 201 and receiving conductor 301 may be in physical contact, while in other orientations within the range, the transmitting conductor 201 and receiving conductor 301 are not in physical contact and may have their coupling varied. In an embodiment, when a row 201 and column 301 are not in physical contact their coupling may be varied as a consequence of moving closer together or further apart. In an embodiment, when a transmitting conductor 201 and receiving conductor 301 are not in physical contact their coupling may be varied as a consequence of grounding. In an embodiment, when a transmitting conductor 201 and receiving conductor 301 are not in physical contact their coupling may be varied as a consequence of materials translated within the coupled field. In an embodiment, when a transmitting conductor 201 and receiving conductor 301 are not in physical contact their coupling may be varied as a consequence of a changing shape of the transmitting conductor 201 or receiving conductor 301, or an antenna associated with the row or column.

The nature of the transmitting conductor 201 and receiving conductor 301 is arbitrary and the particular orientation is variable. Indeed, the transmitting conductors 201 and receiving conductors 301 are not intended to refer to only a square grid, but rather to a set of conductors upon which signal is transmitted (rows) and a set of conductors onto which signal may be coupled (columns). The notion that signals are transmitted on rows and received on columns itself is arbitrary, and signals could as easily be transmitted on conductors arbitrarily designated columns and received on conductors arbitrarily named rows, or both could arbitrarily be named something else. Further, it is not necessary that rows and columns be in a grid. Other shapes are possible as long as a touch event will affect a row-column coupling. For example, the "rows" could be in concentric circles and the "columns" could be spokes radiating out from the center. And neither the "rows" nor the "columns" need to follow any geometric or spatial pattern, thus, for example, the keys on a keyboard could be arbitrarily connected to form rows and columns (related or unrelated to their relative positions). Moreover, an antenna or conductor may be used as a row having a more defined shape than a simple conductor wire such as for example a row made from ITO. For example an antenna or conductor may be round or rectangular, or have substantially any shape, or a shape that changes. An antenna or conductor used as a row may be oriented in proximity to one or more conductors or antennas, or one or more other antennas or conductors that act as columns. In an embodiment, an antenna or conductor may be used for signal transmission and oriented in proximity to one or more conductors, or one or more other antennas that are used to receive signals. A touch will change the coupling between the antenna or conductor used for signal transmission and the antenna or conductor used to receive signals.

It is not necessary for there to be only two types signal propagation channels: instead of transmitting conductors 201 and receiving conductors 301, in an embodiment, channels "A", "B" and "C" may be provided, where signals transmitted on "A" could be received on "B" and "C", or, in an embodiment, signals transmitted on "A" and "B" could be received on "C". It is also possible that the signal propagation channels can alternate function, sometimes supporting transmitters and sometimes supporting receivers. It is also contemplated that the signal propagation channels can simultaneously support transmitters and receivers—provided that the signals transmitted are orthogonal, and thus separable, from the signals received. Three or more types of antenna or conductors may be used rather than just "rows" and "columns." Many alternative embodiments are possible and will be apparent to a person of skill in the art after considering this disclosure. It is likewise not necessary for there to be only one signal transmitted on each transmitting media. In an embodiment, multiple orthogonal signals are transmitted on each row or antenna.

Returning briefly to FIG. 1, as noted above, in an embodiment the panel 400, which is a touch surface, comprises a series of transmitting conductors 201 and receiving conductors 301, along which signals can propagate. As discussed above, the transmitting conductors 201 and receiving conductors 301 are oriented so that, when they are not being touched the signals are coupled differently than when they are being touched. The change in signal coupled between them may be generally proportional or inversely proportional (although not necessarily linearly proportional) to the touch such that touch is measured as a gradation, permitting distinction between more touch (i.e., closer or firmer) and less touch (i.e., farther or softer)—and even no touch.

A receiver 300 is attached to each receiving conductor 301, which has a signal processor 302 operatively connected thereto. The receiver 300 is designed to receive the signals present on the receiving conductor 301, including any of the orthogonal signals, or an arbitrary combination of the orthogonal signals, and any noise or other signals present. Generally, the receiver is designed to receive a frame of signals present on the receiving conductor 301, and to identify the columns providing signal. A frame of signals is received during an integration period or sampling period. In an embodiment, the signal processor 302 associated with the receiver data may determine a measure associated with the quantity of each of the orthogonal transmitted signals present on that receiving conductor 301 during the time the frame of signals was captured. In this manner, in addition to identifying the transmitting conductors 201 in touch with each receiving conductor 301, the receiver can provide additional (e.g., qualitative) information concerning the touch. In general, touch events may correspond (or inversely correspond) to the received signals on the receiving conductors 301. For each receiving conductor 301, the different signals received thereon indicate which of the corresponding transmitting conductor 201 is being touched simultaneously with that receiving conductor 301. In an embodiment, the amount of coupling between the corresponding transmitting conductor 201 and receiving conductor 301 may indicate, e.g., the area of the surface covered by the touch, the pressure of the touch, etc. In an embodiment, a change in coupling over time between the corresponding transmitting conductor 201 and receiving conductor 301 indicates a change in touch at the intersection of the two.

In an embodiment, a mixed signal integrated circuit comprises signal generator, transmitter, receiver and signal processor. In an embodiment, the mixed signal integrated circuit is adapted to generate one or more signals and send the signals to transmit antennas. In an embodiment, the mixed signal integrated circuit is adapted to generate a plurality of frequency-orthogonal signals and send the plurality of frequency-orthogonal signals to the transmit antenna. In an embodiment, the mixed signal integrated circuit is adapted to generate a plurality of frequency-orthogonal signals and send one or more of the plurality of frequency-orthogonal signals to each of a plurality of rows. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of an integration period (i.e., the sampling period).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that, the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to touch. In other words, the measure corresponding to signal strength in a given bin would change as a result of a touch event.

Figure 2:
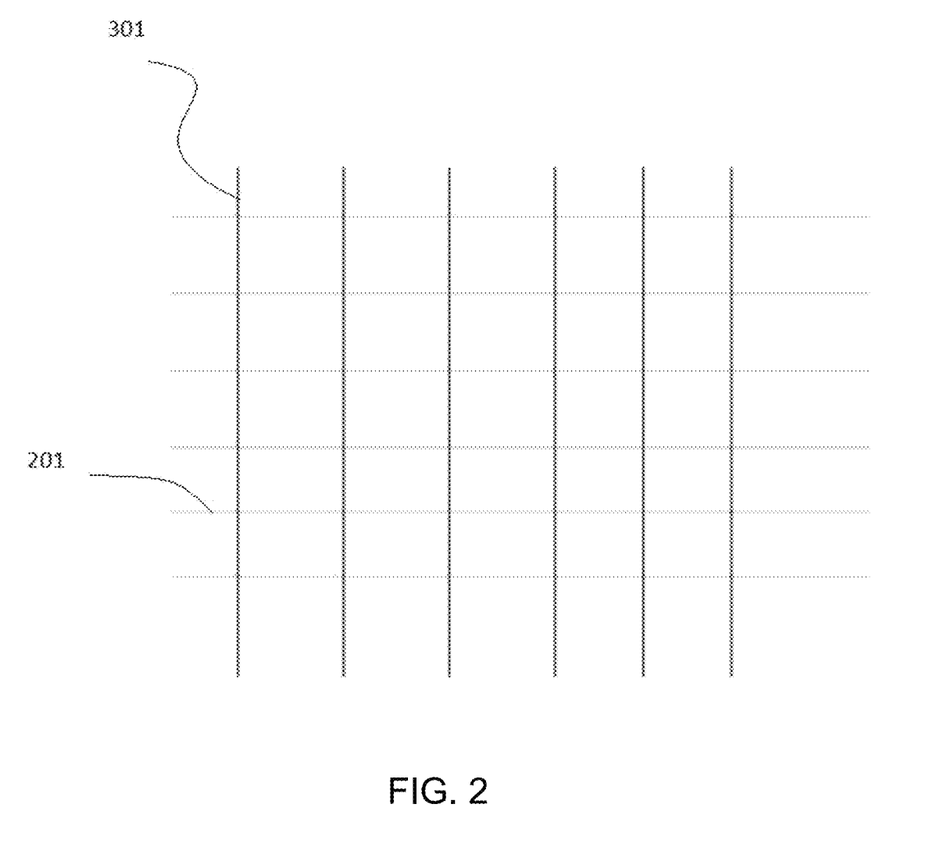
FIG. 2 is a diagram illustrating a mode of operation for the sensor.

FIG. 2 is a diagram illustrating a mode of operation for the sensor. Show in FIG. 2 is a sampling of the transmitting conductors 201 and the receiving conductors 301. In the mode of operation illustrated in FIG. 2, only the receiving conductors 301 are operated. The transmitting conductors 201 may be connected to a high impedance p-channel field-effect transistor or disconnect in order to leave only receiving conductors 301 operating. This mode of operation is used primarily when a signal is being infused through the body or transmitted via a different transmitting antenna or conductor other than the transmitting conductor 201. In FIG. 2, all of the receiving conductors 301 are shown connected and capable of receiving a transmitted signal, however, in an embodiment fewer than all the receiving conductors 301 may be connected. In an embodiment a switch is connected between the receiving conductors 301 and the transmitting conductors 201 so that the functions of the transmitting conductors 201 and the receiving conductors 301 can change between each other. In an embodiment, both the transmitting conductor 201 and the receiving conductors 301 can operate to receive signals.

Figure 3:
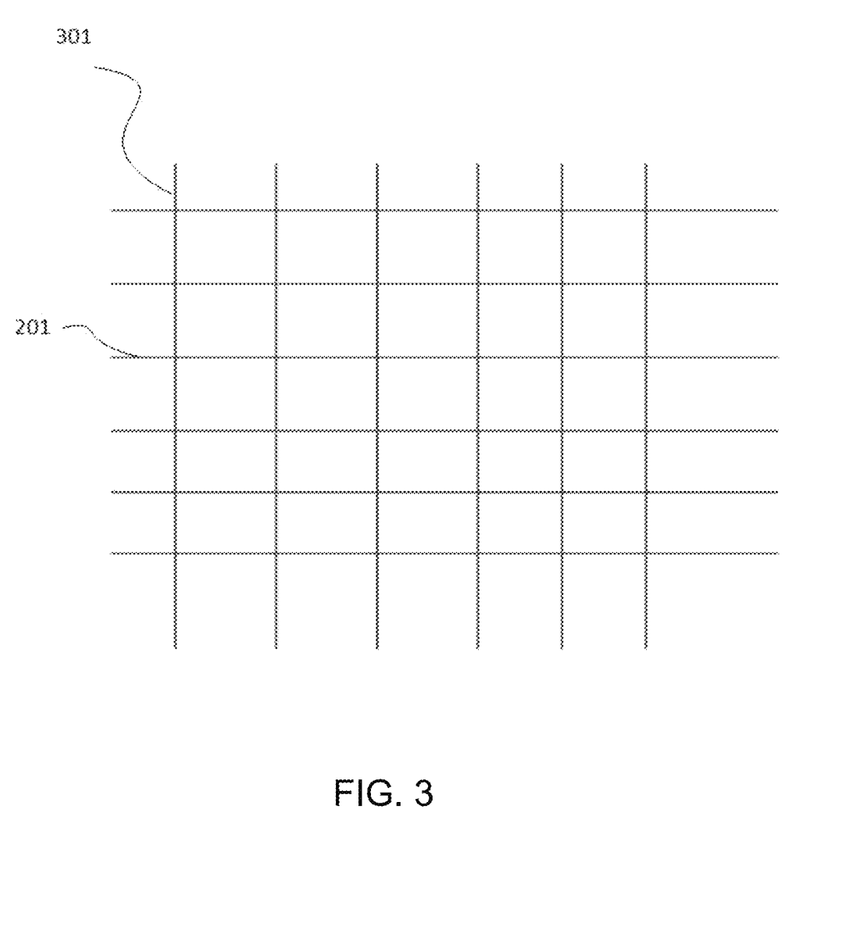
FIG. 3 is a diagram illustrating another mode of operation for the sensor.

FIG. 3 is a diagram illustrating another mode of operation for the sensor. This mode is also described above with respect to FIG. 1. In this mode transmitting conductors 201 transmit and receiving conductors 301 receive signals. Interactions with the sensor are used to create heat maps which are used to ascertain and determine touch events. This mode is good for detecting touch events such as contact and "close" touch events. By close touch events it is meant touch events that are within a few centimeters of the surface of sensor. However, it should be understood that touch events that occur at distances further than this are still able to be detected. Indeed, by referring to close touch events it is meant that touch events that occur at locations on the surface of the sensor or more proximate to the surface of the sensor than touch events that occur using other modes of operation.

Figure 4:
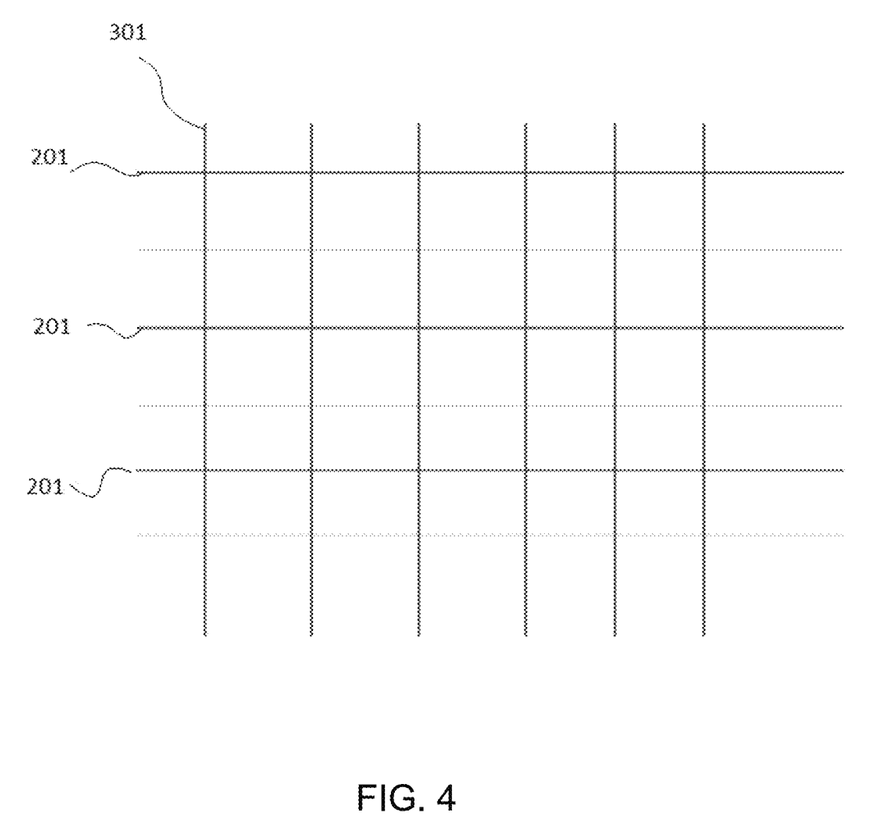
FIG. 4 is a diagram illustrating another mode of operation for the sensor.

FIG. 4 is a diagram illustrating another mode of operation of the sensor. In this mode the number of active transmitting conductors 201 are reduced as compared to the transmitting conductors 201 in the mode illustrated in FIG. 3. The mode illustrated in FIG. 3, for ease of reference, is herein referred to as the first mode. That is to say the panel has a first mode in which typically all of the transmitting conductors 201 are transmitting a signal. In another, second mode, less transmitting conductors 201 transmit a signal than in the first mode. In an embodiment, half of the transmitting conductors 201 are active as compared to the transmitting conductors 201 that operated in the first mode. In an embodiment, three quarters of the transmitting conductors 201 are active as compared to the transmitting conductors 201 that operated in the first mode. In an embodiment, one quarter of the transmitting conductors 201 are active as compared to the transmitting conductors 201 that operated in the first mode. In an embodiment, one third of the transmitting conductors 201 are active as compared to the transmitting conductors 201 that operated in the first mode. In an embodiment, one eighth of the transmitting conductors 201 are active as compared to the transmitting conductors 201 that operated in the first mode. In an embodiment, one sixth of the transmitting conductors 201 are active as compared to the transmitting conductors 201 that operated in the first mode. In an embodiment, one ninth of the transmitting conductors 201 are active as compared to the transmitting conductors 201 that operated in the first mode. In an embodiment, one tenth of the transmitting conductors 201 are active as compared to the transmitting conductors 201 that operated in the first mode. In an embodiment, a predetermined number of transmitting conductors 201 less than that which was operating in the first mode are used. In an embodiment, the transmitting conductors 201 that are active are equidistant from each other active transmitting conductor 201. In an embodiment the transmitting conductors 201 that are active are not-equidistant from each other. In an embodiment, the transmitting conductors 201 are able to operate in a plurality of additional modes in addition to the first mode, where the plurality of additional modes each operate a different number of transmitting conductors 201 that the first mode (for example, a second mode of ½ active transmitting conductors 201 and a third mode of ¼ active transmitting conductors 201.)

The magnitude of the signal on the transmitting conductors 201 is high which enables the range of detection of touch events to be increased. The reduction of the transmitting conductors 201 also reduces the number of small signal grounds in the sensor area. The magnitude of the signal on the transmitting conductor 201 is able to be increased due to the increased distance between adjacent transmitting conductor 201. By receiving the amplified signals on the receiving conductors 301, touch events that occur further from the surface of the touch panel than those that occur during operation in the first mode can be detected. This enables the touch panel to operate in more than one mode where the sensitivity to touch events can be varied depending on the needs of a user or the desired level of sensitivity.

Figure 5:
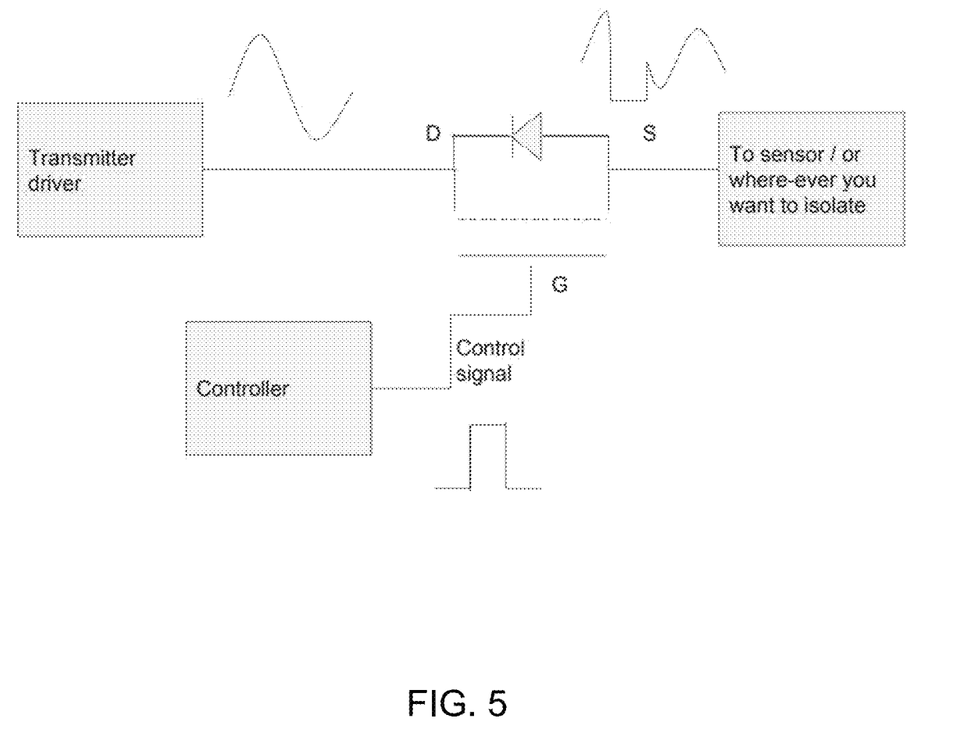
FIG. 5 is a schematic view of sensor arrangement.

Referring to FIG. 5, the more low impedance conductors used near the touch surface, the less distance from the touch surface is able to be detected and the more the system will only respond to close touch events. By disabling high impedance of the transmitting conductors, the number of low impedance conductors in the area are reduced, allowing the field lines to reach further away from the surface of a touch sensor so as to better detect hover events. In an embodiment, the transmitting conductors can go into high impedance mode under software control to collect data about close touch events and hover events in a time multiplexed fashion. In FIG. 5, the −vgs may be greater than the Vth of the pfet used. When the control signal is active the signal at D may be allowed to go to the signal at S with minimal (i.e. single digit ohm) impedance. When the control signal is inactive the −vgs may be at or near zero volts and the path from D to S becomes a high impedance path. In an embodiment, a single pfet may be used for efficient multiple transmitting and fast switching.

In an embodiment, an aspect of the present disclosure is a touch sensor. The touch sensor comprises a plurality of transmitting conductors adapted to transmit in at least a first mode and a second mode; a signal generator operatively connected to the plurality of transmitting conductors, the signal generator being configured to transmit a frequency orthogonal signal on each of the plurality of transmitting conductors; a plurality of receiving conductors operatively connected to a receiver; a signal processor operatively connected to the receiver, the signal processor being configured to process a receive signal received on each of the plurality of receiving conductors during a plurality of integration periods, and for each of the plurality of integration periods and for each of the plurality of receiving conductors to determine a measurement for determining a touch event; and wherein during the first mode more of the plurality of transmitting conductors transmit a frequency orthogonal signal than during the second mode, wherein during the second mode a touch event is able to be determined at a distance further from the touch sensor than during the first mode.

Another aspect of the disclosure is a touch sensor. The touch sensor comprising a first plurality of conductors adapted to transmit signals in a first mode; a second plurality of conductors adapted to transmit signals in a second mode; a third plurality of conductors adapted to receive signals in the first mode and the second mode; a signal generator operatively connected to the first plurality of conductors and the second plurality of conductors, the signal generator being configured to transmit signals on each of the first plurality of conductors and the second plurality of conductors; a signal processor operatively connected the third plurality of conductors, the signal processor being configured to process a receive signal received on each of the third plurality of conductors during a plurality of integration periods, and for each of the plurality of integration periods and for each of the third plurality of conductors to determine a measurement for determining a touch event; and wherein a number of conductors in the first plurality of conductors is greater than a numbers conductors in the second plurality of conductors, wherein during the second mode a touch event is able to be determined at a distance further from the touch sensor than during the first mode.

Still yet another aspect of the disclosure is a method for detecting touch events. The method of detecting touch events comprises transmitting signals along a plurality of transmitting conductors in a first mode, wherein the transmitting conductors are operably connected to a signal generator, the signal generator being configured to transmit a frequency orthogonal signal on each of the plurality of transmitting conductors; receiving signals on a plurality of receiving conductors, wherein the plurality of receiving conductors are operably connected to a receiver, wherein a signal processor is operatively connected to the receiver, the signal processor being configured to process received signals on each of the plurality of receiving conductors during a plurality of integration periods, and for each of the plurality of integration periods and for each of the plurality of receiving conductors to determine a measurement for determining a touch event; determining a first touch event occurring in the first mode; transmitting signals in a second mode, wherein in the second mode fewer transmitting conductors transmit signals; determining a second touch event occurring in the second mode wherein the second touch event occurs at a distance further from the touch sensor than during the first mode.

While the invention has been particularly shown and described with reference to a preferred embodiment thereof, it will be understood by those skilled in the art that various changes in form and details may be made therein without departing from the spirit and scope of the invention.

The invention claimed is:

1. A touch sensor comprising:
   a plurality of transmitting conductors adapted to transmit in at least a first mode and a second mode;
   a signal generator operatively connected to the plurality of transmitting conductors, the signal generator being configured to generate a plurality of frequency orthogonal signals, and to transmit at least one of the plurality of frequency orthogonal signals on each of a set of transmitting conductors of the plurality of transmitting conductors;
   a plurality of receiving conductors operatively connected to a receiver;
   a signal processor operatively connected to the receiver, the signal processor being configured to process a signal received on each of the plurality of receiving conductors during a plurality of integration periods, and for each of the plurality of integration periods and for each of the plurality of receiving conductors to determine a measurement for determining a touch event; and
   wherein during the first mode the set contains more transmitting conductors of the plurality of transmitting conductors than during the second mode, wherein during the second mode a touch event is able to be determined at a distance further from the touch sensor than during the first mode.

2. The touch sensor of claim 1, wherein during the second mode half of the transmitting conductors transmit a frequency orthogonal signal than transmit during the first mode.

3. The touch sensor of claim 1, further comprising a third mode, wherein a different number of transmitting conductors transmit a frequency orthogonal signal than in the first mode or the second mode.

4. The touch sensor of claim 1, wherein during the second mode one fourth of the transmitting conductors transmit a frequency orthogonal signal than transmit during the first mode.

5. The touch sensor of claim 1, wherein during the second mode the transmitting conductors that transmit a frequency orthogonal signal are equidistant from each other.

6. The touch sensor of claim 1, wherein during the second mode the transmitting conductors that transmit a frequency orthogonal signal are not equidistant from each other.

7. The touch sensor of claim 1, wherein during the second mode three-quarters of the transmitting conductors transmit a frequency orthogonal signal than transmit during the first mode.

8. A touch sensor comprising:
   a first plurality of conductors adapted to transmit signals in a first mode;
   a second plurality of conductors adapted to transmit signals in a second mode;
   a third plurality of conductors adapted to receive signals in the first mode and the second mode;
   a signal generator operatively connected to the first plurality of conductors and the second plurality of conductors, the signal generator being configured to generate a plurality of frequency orthogonal signals, and to transmit at least one of the plurality of frequency orthogonal signals on each of the first plurality of conductors and the second plurality of conductors;
   a signal processor operatively connected the third plurality of conductors, the signal processor being configured to process a signal received on each of the third plurality of conductors during a plurality of integration periods, and for each of the plurality of integration periods and for each of the third plurality of conductors to determine a measurement for determining a touch event; and
   wherein a number of conductors in the first plurality of conductors is greater than a numbers conductors in the second plurality of conductors, wherein during the second mode a touch event is able to be determined at a distance further from the touch sensor than during the first mode.

9. The touch sensor of claim 8, wherein the number of conductors in the second plurality of conductors is half the number of conductors in the first plurality of conductors.

10. The touch sensor of claim 8, further comprising a third plurality of conductors adapted to transmit signals in a third mode, wherein a number of conductors in the third plurality of conductors are different than the number of conductors in the first plurality of conductors and the number of conductors in the second plurality of conducts.

11. The touch sensor of claim 8, wherein the number of conductors in the second plurality of conductors is one fourth the number of conductors in the first plurality of conductors.

12. The touch sensor of claim 8, wherein the conductors in the second plurality of conductors are equidistant from each other.

13. The touch sensor of claim 8, wherein the second plurality of conductors are not equidistant from each other.

14. The touch sensor of claim 8, wherein conductors in the second plurality of conductors is three quarters the conductors in the first plurality of conductors.

15. A method of detecting touch events comprising:
    transmitting signals along a plurality of transmitting conductors in a first mode, wherein the transmitting conductors are operably connected to a signal generator, the signal generator being configured to generate a plurality of frequency orthogonal signals, and to transmit at least one of the plurality of frequency orthogonal signals on each of a set of transmitting conductors of the plurality of transmitting conductors;
    receiving signals on a plurality of receiving conductors, wherein the plurality of receiving conductors are operably connected to a receiver, wherein a signal processor is operatively connected to the receiver, the signal processor being configured to process received signals on each of the plurality of receiving conductors during a plurality of integration periods, and for each of the plurality of integration periods and for each of the plurality of receiving conductors to determine a measurement for determining a touch event;
    determining a first touch event occurring in the first mode;
    transmitting signals in a second mode, wherein in the second mode fewer transmitting conductors of the set transmit signals;
    determining a second touch event occurring in the second mode wherein the second touch event occurs at a distance further from the touch sensor than during the first mode.

16. The method of claim 15, wherein during the second mode half of the transmitting conductors transmit a signal than transmit during a first mode.

17. The method of claim 15, further comprising transmitting signals in a third mode, wherein a different number of transmitting conductors transmit signals than in the first more or the second mode.

18. The method of 15, wherein during the second mode one fourth of the transmitting conductors transmit a signal than transmit during a first mode.

19. The method of claim 15, wherein during the second mode the transmitting conductors that transmit a signal are equidistant from each other.

20. The method of claim 15, wherein during the second mode the transmitting conductors that transmit a signal are not equidistant from each other.

* * * * *